United States Patent
D'Eletto

(10) Patent No.: US 7,245,609 B2
(45) Date of Patent: Jul. 17, 2007

(54) APPARATUS AND METHOD FOR VOICE OVER IP TRAFFIC SEPARATION AND FACTOR DETERMINATION

(75) Inventor: Robert D'Eletto, Highlands Ranch, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 823 days.

(21) Appl. No.: 10/698,251

(22) Filed: Oct. 31, 2003

(65) Prior Publication Data

US 2005/0094623 A1    May 5, 2005

(51) Int. Cl.
  *H04L 12/66* (2006.01)
(52) U.S. Cl. ............... 370/352; 379/126; 379/112.01; 379/112.06; 379/115.01
(58) Field of Classification Search ........... 370/352, 370/355, 356, 967; 379/126, 112.01, 112.06, 379/115.01, 133
See application file for complete search history.

(56) References Cited

U.S. PATENT DOCUMENTS

| | | | |
|---|---|---|---|
| 6,385,301 B1 * | 5/2002 | Nolting et al. | 379/32.01 |
| 6,721,405 B1 * | 4/2004 | Nolting et al. | 379/133 |
| 6,744,866 B1 * | 6/2004 | Nolting et al. | 379/133 |
| 7,174,156 B1 * | 2/2007 | Mangal | 455/406 |
| 7,197,560 B2 * | 3/2007 | Caslin et al. | 709/224 |
| 2002/0064149 A1 * | 5/2002 | Elliott et al. | 370/352 |
| 2003/0214971 A1 * | 11/2003 | Sheldon et al. | 370/467 |
| 2004/0249649 A1 * | 12/2004 | Stratton et al. | 705/1 |
| 2005/0195745 A1 * | 9/2005 | Scott et al. | 370/241 |
| 2006/0002534 A1 * | 1/2006 | Lang et al. | 379/126 |
| 2006/0258339 A1 * | 11/2006 | Connelly et al. | 455/414.1 |
| 2006/0274703 A1 * | 12/2006 | Connelly | 370/338 |

* cited by examiner

*Primary Examiner*—Creighton Smith

(57) ABSTRACT

A system for identifying calls traversing a packet network. The system includes an analysis device that receives first signaling information from a packet network and second signaling information from a circuit network. The analysis device correlates the first signaling information with the second signaling information to generate correlated records about calls that traverse both the packet switched network and the circuit network. A database system receives the correlated records and calculates statistics describing traffic that traversed both the packet network and the circuit network.

42 Claims, 5 Drawing Sheets

VoIP Jurisdiction Minutes of Use (MOU) Report

Monitored period: August 1, 2003 - August 31, 2003

Originating Carrier: IXC

Terminating Network: LEC

| JURISDICTION | GATEWAY USED | TRUNK USED | ANSWERED CALLS | ANSWERED MOU |
|---|---|---|---|---|
| INTERSTATE | CL3893947 | AL42394 | 300,000,000 | 900,000,000 |
| INTRASTATE | CL7839853 | CB58396 | 425,108,023 | 1,000,689,040 |
| LOCAL | CL3689747 | GH90903 | 289,738,837 | 802,093,531 |
| INTERSTATE | CL0939391 | SU90304 | 306,830,294 | 986,034,739 |
| TOTAL: | | | 1,321,677,154 | 3,688,817,310 |

FIG. 5

APPARATUS AND METHOD FOR VOICE OVER IP TRAFFIC SEPARATION AND FACTOR DETERMINATION

BACKGROUND OF THE INVENTION

It has become clear to telecommunications carriers that voice traffic and services will be one of the next major applications to take advantage of the Internet Protocol (IP). This expectation is based on the impact of a set of technologies generally referred to as voice over IP (VoIP) or IP telephony. VoIP supplies many unique capabilities to carriers and customers using IP or other packet-based networks. The most important benefits include cost savings and integrated voice and data networks.

By moving voice traffic to IP networks, companies may reduce or eliminate certain toll charges associated with transporting calls over the Public Switched Telephone Network (PSTN). Service providers and end users can also conserve bandwidth by investing in additional capacity as needed. This is made possible by the distributed nature of VoIP and by reduced operations costs as companies combine voice and data traffic onto one network. By making voice "just another IP application," companies can build truly integrated networks for voice and data. These integrated networks not only provide the quality and reliability of today's PSTN, they also enable companies to quickly and flexibly take advantage of new opportunities within the changing world of communications.

Around 1995, the first commercial VoIP products began to hit the market. These products were targeted at companies looking to reduce telecommunications expenses by moving voice traffic to packet networks. Early adopters of VoIP networks built toll-bypass solutions to take advantage of the fact that local exchange carriers (LECs) were not able to bill access charges on voice call placed through the Internet. Without any established standards, most early implementations were based on proprietary technology. As these packet telephony networks grew and interconnection dependencies emerged, it became clear that the industry needed standard VoIP protocols. Several groups took up the challenge, resulting in several independent standards, each with its own unique characteristics. Currently, four different signaling and call control protocols for VoIP are popular: H.323; Media Gateway Control Protocol (MGCP); H.248/Megaco; and Session Initiation Protocol (SIP).

H.323 is an ITU Recommendation that defines "packet-based multimedia communications systems." In other words, H.323 defines a distributed architecture for creating multimedia applications, including VoIP. Media Gateway Control Protocol (MGCP), also known as IETF RFC 2705, defines a centralized architecture for creating multimedia applications, including VoIP. H.248, also referred to as IETF RFC 2885 (Megaco), is an ITU Recommendation that defines a "Gateway Control Protocol." H.248 is the result of a joint collaboration between the ITU and the Internet Engineering Task Force (IETF) which defined a centralized architecture for creating multimedia applications, including VoIP. In many ways, H.248 builds on and extends MGCP. Session Initiation Protocol (SIP), also known as IETF RFC 3261, defines another distributed architecture for creating multimedia applications, including VoIP. It is also worth mentioning the Real-Time Transport Protocol (RTP), also known as IETF RFC 1889, which defines a transport protocol for real-time applications used by all of the VoIP signaling protocols. Specifically, RTP provides the transport to carry the audio/media portion of VoIP communication.

Interexchange carriers (IXCs) are starting to build networks to facilitate the use of VoIP across their service areas. These networks are being added to the exiting PSTN to form a combined network. Such combined networks (i.e. networks relying on different bearer technologies and/or signaling protocols such as PSTN and packet networks such as TCP/IP or ATM) are typically termed interconnected dissimilar networks or hybrid networks. Present estimates are that at least some IXCs offload up to 25% of their traffic onto packet networks. It is envisioned that packet networks will eventually replace switched networks due to cost and reliability factors. However, as with many technologies in the telephony area, acceptance has been slower than some would like.

The various dissimilar networks in a hybrid network are typically interconnected via gateways that provide the necessary conversions or adaptations between the bearer traffic and possibly signaling protocol in each of the networks. The operating characteristics of gateways are defined by the various signaling and call control protocols, i.e. H.323; Media Gateway Control Protocol (MGCP); H.248/Megaco; and Session Initiation Protocol (SIP).

FIG. 1 is a simplified schematic view illustrating a MGCP communication environment 100 having a packet network 106 and a public switched telephone network (PSTN) 112. The MGCP protocol provides a comprehensive solution for the control of gateways, termed Media Gateways (MG(s)) in the specification of the protocol. MGCP is based on the principle that all call processing intelligence resides in the MGC. The MG does not retain knowledge of call state; it provides only the capability to cross-connect various kinds of media streams under the control of the MGC and to detect and transmit various kinds of signaling associated with those media streams.

MGCP views MGs as a collection of terminations, each of which represents a certain kind of media stream. A termination may be a fixed physical entity such as an analog line or a digital signal level 0 (DS-0) time slot in a DS-1 interface, or it may be a logical entity such as a voice-over-IP (VoIP) packet stream. Logical terminations may be created and destroyed by means of MGCP commands.

Cross-connections within an MG are created by means of MGCP commands that request two or more terminations to be placed in the same context. If the media streams associated with terminations that are in the same context are of different types (for instance, one is a DS-0 time slot while the other is a VoIP packet stream), the MG is expected to perform appropriate media conversion between them. To support this, terminations have various media stream properties associated with them such as the identity of the voice encoding that is to be used.

Terminations have other properties, such as a list of signaling events that they are expected to notify to the MGC and a list of signals that they are capable of transmitting on request from the MGC. For example, an analog line termination should be capable of notifying the MGC when it sees an off-hook or an on-hook event; it should also be capable of applying ringing on the line when requested by the MGC. The events and signals that are associated with a specific type of termination are described in a package.

Referring once again to FIG. 1, the PSTN 112 generally includes a bearer portion 126, over which user traffic, such as a telephone call using time division multiplexed (TDM) is communicated, and a signaling portion 128 over which signaling traffic, such as SS7 traffic, is carried. The packet network 106 can be, for example, an asynchronous transfer mode (ATM) network, an internet protocol (IP), or any other packet switching network.

The communication environment 100 also includes a media gateway controller (MGC) 102, which, when coupled with a signaling gateway 162, is sometimes referred to as a "softswitch" 164. The MGC 102 communicates with a media gateway (MG) 105 via the packet network 106 and communication lines 132 and 143. The signaling gateway 162 communicates with the PSTN 112 via connection 136. A Trunking media gateway 104 couples the packet network to the PSTN 112 via connection 144. Trunking media gateways are special gateways that interconnect a packet network to the PSTN, while generic MGs generally serve VoIP customers. The MGC 102 may also be coupled, via the PSTN 112, to one or more other media gateway controllers, an exemplar one of which is illustrated using reference numeral 108. Further, although not shown in FIG. 1, two MGCs may communicate over the packet network 106 using, for example, the SIP protocol.

A first switch (switch A) 114 connects to the PSTN 112 via connection 152 and a second switch (switch B) 116 connects to the PSTN 112 via connection 154. The switches 114 and 116, are typically considered part of the PSTN 112, and are may be located at telephone company central offices (not shown). By way of example, a telephone 124 is shown coupled to switch 114 via connection 156 and a telephone 122 is shown coupled to switch 116 via connection 158. A phone 118 is shown connected to the media gateway 105 via connection 146.

As known to those having ordinary skill in the art, both user traffic and signaling information typically traverse both the packet network, 106 and the PSTN 112. The links 136 and 148 typically carry PSTN signaling traffic, such as signaling system seven (SS7) integrated services digital network user part (ISUP) or telephone user part (TUP) signaling messages. The connections 132, 142, and 143 typically carry packet network signaling traffic in the form of packets constructed using, in this example, the media gateway control protocol (MGCP).

User traffic, for example a telephone call that might occur between telephones 118 and 124, typically traverses communication links 146, 143, 142, 144, 152 and 156. Because the call traverses both the packet network 106 (communication lines 143 and 142) and the PSTN 112 (communication lines 144, 152 and 156), the user traffic (telephone call) is identified by two different communication protocols. In this example, the packet portion of the call signaling is identified using the MGCP protocol, while the PSTN portion of the call, signaling is identified using the SS7 ISUP protocol. The use of different protocols mean that not only are the set up and tear down messages different but even the naming conventions for devices on the connection are completely different.

A call setup message in the SS7 ISUP protocol would take the form of an initial address message (IAM), while a call tear-down message in the SS7 ISUP protocol would take the form of a release message (REL) or a release complete message (RLC). Conversely, in the packet network 106 using MGCP, a call setup message would take the form of a create connection (CRCX) message while a call tear-down message would take the form of a delete connection (DLCX) message. Further, while described using call setup and call tear-down messages, other signaling messages (that typically occur between the setup and tear-down messages) in both the SS7 and MGCP protocols will traverse the dissimilar communication networks.

In the packet network 106, communication endpoints, such as the MG 105 are characterized by their "endpoint name," which typically takes the form "user identifier@domain.xxx," while in the PSTN 112, a call is identified by a point code (PC) that relates to its originating point code (OPC), destination point code (DPC) and the circuit, identified by its circuit identification code (CIC), on which it is carried.

Because the signaling used in a single phone call between telephone 118 and 124 is characterized by two separate communication protocols (SS7 ISUP on the PSTN side and MGCP on the packet side), it is difficult to provide a single end to end call record, commonly referred to as a call detail record (CDR) because of the two different communication protocols used to signal the call. Of course, if all carriers implemented packet switching networks using a single protocol and cross connects said networks, the task of providing a single end to end call record would be simplified.

At the present time, most LECs currently do not have the facilities to even accept packet traffic, meaning the IXC must pass the traffic through a trunking media gateway—converting the traffic back to a circuit switched call. For many of the reasons cited hereinabove, not the least of which is the cost savings to be realized if IP-IP connection can be made between LECs and IXC, many LECs desire to move toward sending and receiving packet traffic rather than traditional switched traffic. However, most LECs are cautious and do not want to implement packet network gateways until they can be guaranteed that IXCs will fill such packet networks with revenue generating traffic or that these connections will be reliable.

In general, the allocation of revenue between carriers is handled using "tariffs." The term tariff generally refers to documents filed by a regulated telephone company with a state public utility commission detailing services, equipment and pricing offered by a telephone company to all potential customers. Historically, to settle the tariffs for access charges between IXCs and LECs (the charge from the destination LEC to the IXC for completing the circuit on the local network), the IXCs would self-report the minutes of use for traffic that satisfied each tariff, for example local or long distance connections, intrastate connections, interstate connections, transit connections, etc. Using SS7 based operation support systems (OSS), LEC are able to verify many of the so-called factors (the percentage of traffic that falls under each tariff) on circuit switched interconnections.

At the present time tariffs for VoIP traffic have not been finalized. Existing access charge methodologies now in place assume all traffic between LECs and IXCs is circuit switch based. However, the FCC has yet to issue a ruling as to whether VoIP traffic is an enhanced service exempt from regulation and access charges. To add further confusion, several states have recently issued conflicting decisions regarding the oversight and taxing of VoIP traffic. Accordingly, both IXCs and LEC need a billing system that is flexible enough to handle the current tariffs along with future tariffs that may be radically different.

Unfortunately for LECs, at the present time only IXCs have the capability to determine the percentage of VoIP traffic on their networks. As traffic is passed across a gateways, LECs have no access to information that confirms the percentage of packet traffic they receive. IXCs could provide SS7 parameters regarding such traffic, but no standard exits for such data. LECs are desirable of receiving accurate and verifiable records of VoIP traffic to ensure compliance with existing and future tariffs. LECs are also desirable of receiving accurate and verifiable factors regarding the VoIP traffic to ensure compliance with tariffs.

The inventors have recognized that a different approach is needed to monitor VoIP traffic, simplify the management and reconciliation of carrier to carrier access charges, and still allow the identifications, jurisdictionalization and correlation of VoIP telephony traffic transiting carrier boundaries.

BRIEF DESCRIPTION OF THE DRAWINGS

An understanding of the present invention can be gained from the following detailed description of the invention, taken in conjunction with the accompanying drawings of which:

FIG. 5 is a representation of a report produced in accordance with a preferred embodiment of the present invention.

DETAILED DESCRIPTION

Figure 1:
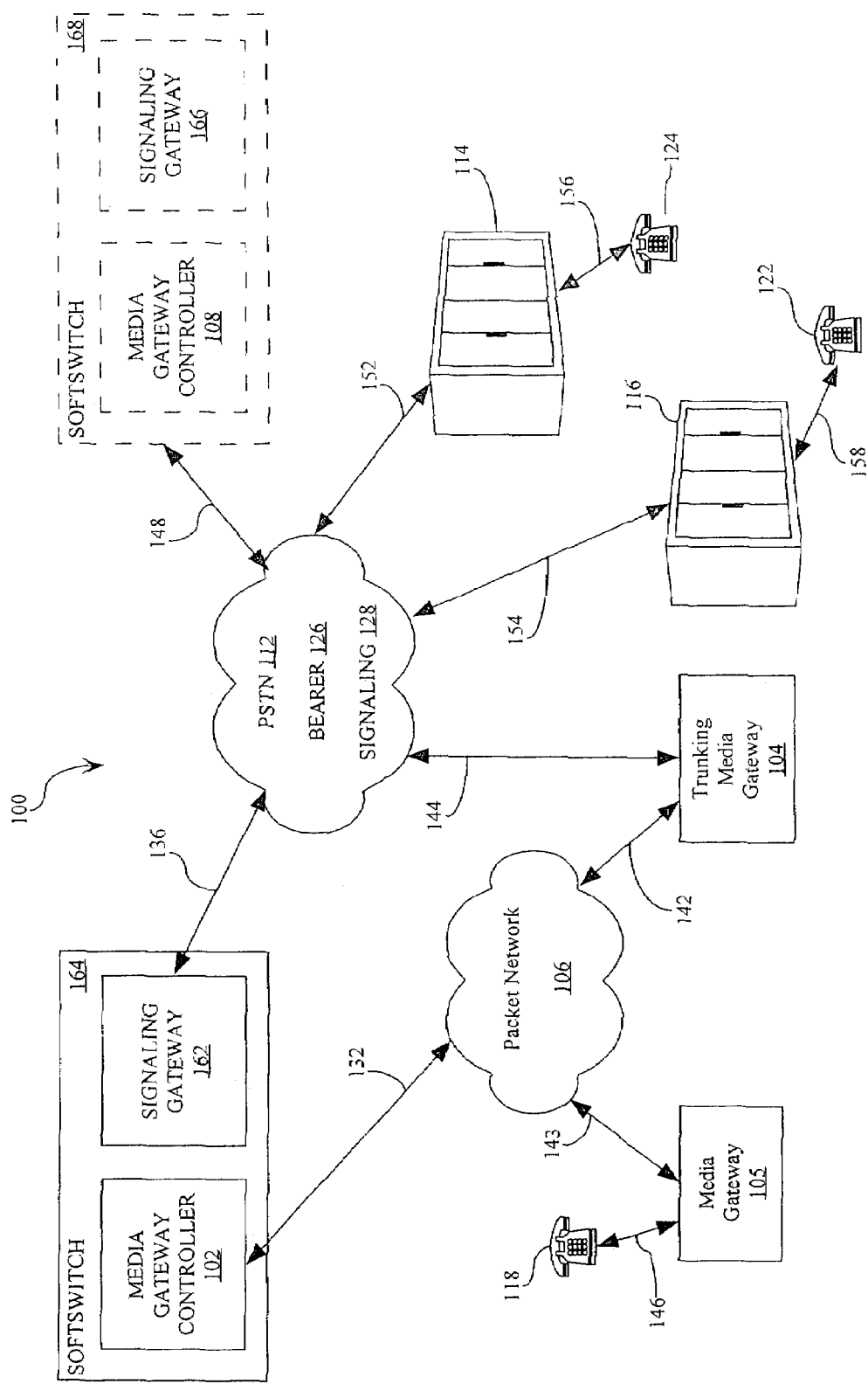
FIG. 1 is a simplified schematic view illustrating a communication environment having a packet network and a public switched telephone network.

Reference will now be made in detail to the present invention, examples of which are illustrated in the accompanying drawings, wherein like reference numerals refer to like elements throughout.

The detailed description that follows is presented in terms of general procedures and symbolic representations of operations of data within a computer memory, associated computer processors, networks, and network devices. These procedure descriptions and representations are the means used by those skilled in the data processing art to convey the substance of their work to others skilled in the art. As used herein the term "procedure" refers to a series of operations performed by a processor, be it a central processing unit of a computer, or a processing unit of a network device, and as such, encompasses such terms of art as: "software," "objects," "functions," "subroutines" and "programs."

The present invention, as described hereinafter, can be implemented using AGILENT's ACCESS7 OSS system, Business Intelligence system, Call Trace application and associated hardware, including the AGILENT NgN Analysis System. The ACCESS7 OSS system integrates with and monitors an SS7 network. The Agilent NgN Analysis System is a distributed, remote-controllable network monitoring system for next-generation telephony networks. The NgN Analysis System provides signaling analysis and troubleshooting that enables the proactive evaluation, deployment and operation of combined public switched telephony networks (PSTN) and IP-telephony networks. The NgN Analysis System provides detailed call trace and protocol analysis capabilities for signaling information exchanged between softswitches, or media gateway controllers and media gateways. The acceSS7 Call Trace application can be configured to examine calls across both the SS7 network and, using data imported from the NgN analysis System, provide a view into the complex call setup and interworking between the SS7 and IP networks.

Those of ordinary skill in the art will recognize that there exist other platforms and languages for creating software for performing the procedures outlined herein. Further, the present invention is useful with a variety of signaling systems, including the aforementioned H.323; Media Gateway Control Protocol (MGCP); Session Initiation Protocol (SIP); and H.248/Megaco. While the present specification utilizes terminology from the MGCP protocol, the described apparatus and methods may be adapted for other signaling protocols and still fall within the scope of the invention as contemplated by the inventors. While this document describes techniques used in VoIP networks, the techniques are also applicable to other Voice or Fax capable Packet networks such as Frame Relay and ATM networks.

LECs currently rely upon OSS systems connected to SS7 switches within their own networks to generate and validate tariffs. As noted above, VoIP traffic does not have the consistent signaling identifiers, like SS7 circuit switched based traffic, to identify, jurisdictionalize and correlate VoIP calls across a multi-carrier network. Accordingly, LECs are unable to identify traffic that has traversed a packet network. Utilizing an analysis device, as described in co-pending U.S. patent application Ser. No. 10/151,674 incorporated herein by reference and assigned to the assignee of the present application, enhanced call detail records can be generated that can be analyzed to yield reports that identify, jurisdictionalize, and correlate VoIP traffic, e.g. traffic traversing a packet network. This permits LECs to offer tariffs for traffic that utilizes IP networks with the confidence that billing is based on accurate tariff calculations. For example, a discounted tariff can be used to encourage the use of VoIP traffic.

Figure 2:
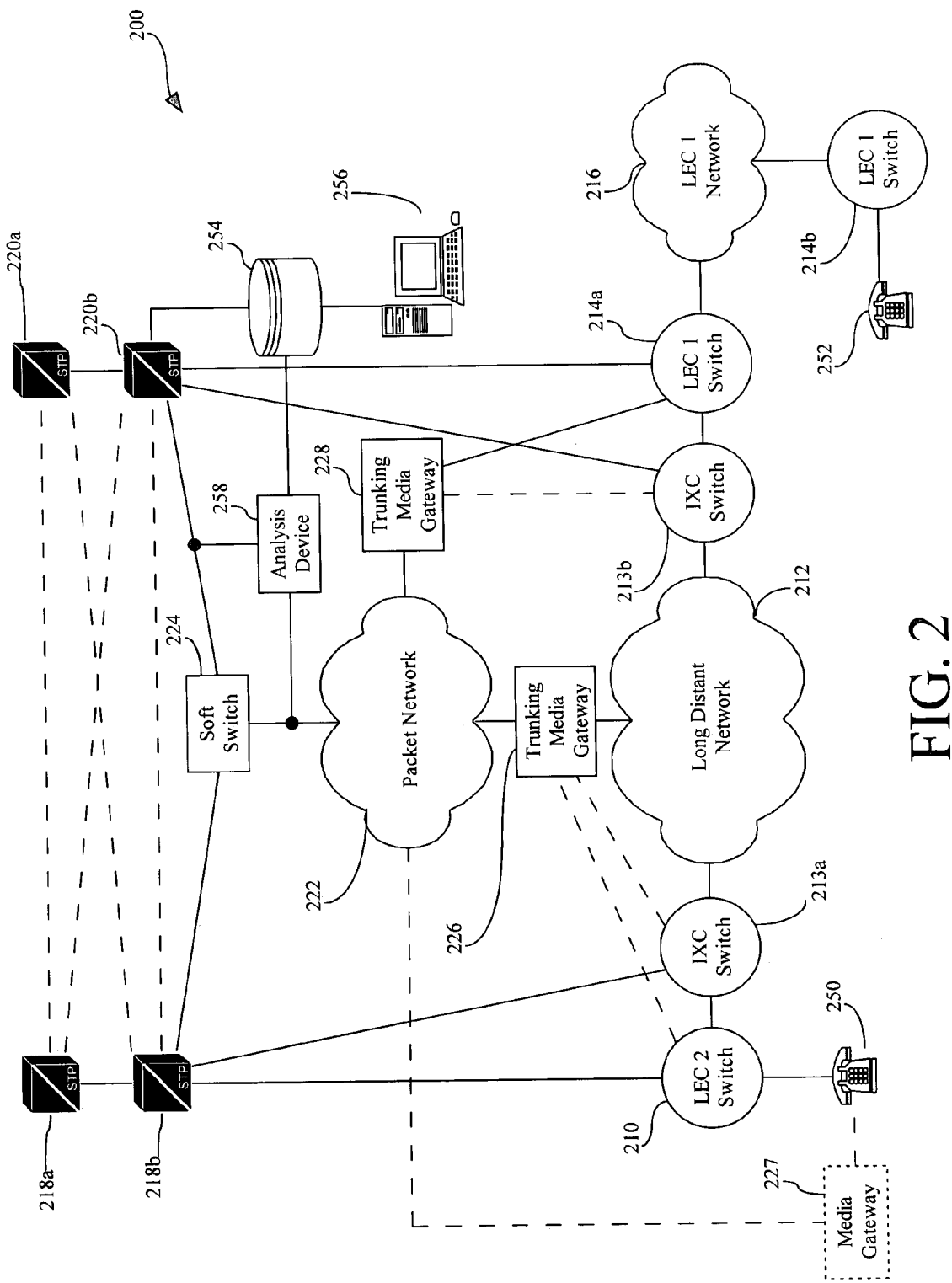
FIG. 2 is a block diagram of a communication environment in accordance with a preferred embodiment of the present invention.

FIG. 2 is a block diagram of a communication environment 200 in accordance with a preferred embodiment of the present invention. While the communication environment 200 in FIG. 2 and the attendant description utilize the architecture and nomenclature of the MGCP protocol, the present invention is equally applicable to other environments and protocols.

For a switched long distant call between subscriber 250 and subscriber 252, the call set up process is as follows. A switch 210 at a Local Exchange Carrier (LEC 2) negotiates a trunk with a switch 213a at long distance network 212 (also referred to as an Inter-eXchange Carrier—IXC). The long distance network 212 in turn negotiates a trunk between the IXC switch 213a and an IXC switch 213b. In turn a connection is negotiated between the IXC switch 213b and a switch 214a at the edge of a LEC 1 network 216 where the call is to terminate. The LEC 1 Network 216 sets up a connection to a switch 214b associated with the subscriber 252.

The actual negotiation process for call setup and teardown is handled via an SS7 network. The switches 210, 213a, 213b, 214a, and 214b typically have SS7 compliant Signal Switching Points (SSPs) co-located therewith. A first pair of Signal Transfer Points (STPs) 218a and 218b is shown connected to the switch 210 of the LEC 2 and the switch 213a of the IXC. A second pair of STPs 220a and 220b is shown connected to the switch 214a of the LEC 1 and the switch 213b of the IXC. As is known in the art, and as shown in FIG. 2, pairs of STPs may be cross-coupled forming a quad.

When a subscriber 250 initiates a call to subscriber 252, switch 210 analyzes the dialed digits, recognizes that an IXC network 212 is to be used and selects an idle trunk thereto. The switch 210 then formulates as initial address message (IAM), identifying the initial switch 210, the switch 213a, the trunk selected, along with additional information about the call. The switch 210 transmits the IAM to the STP 218b for routing to the IXC switch 213a. The STP 218b routes the message to the IXC switch 213a either directly (if a link thereto exists) or though other STPs. The IXC switch 213a, upon receipt of the IAM utilizes the SS7 network, perhaps including the STP 218b, to open a circuit to the long distant network 212 using the IXC switch 213b. In turn the ICX switch 213b initiates a connection with the switch 214a at the edge of the LEC 1's network 216. The switch 214a continues the process by negotiating a connection with the destination switch 214b.

The switch 214b, upon receipt of the IAM, completes the call path back toward the switch 210 and generates an address complete message (ACM) that is transmitted back to the switch 210 through the SS7 network, through switches 241a, 213b, and 213a. The switch 210, upon receipt of the ACM and connects the call to the incoming trunk from the switch 213a. Once the subscriber 252 picks up the phone, the switch 214b sends an answer message to the switch 210 through the other switches to ensure that the subscriber 250 is connected to the outgoing trunk. A similar process occurs in reverse when a caller hangs up to tear the call down.

Many switches, including SS7 compliant switches, generate data about a call, such as the calling parties number, called parties numbers, etc. . . . Known SS7 operations support systems (OSS systems), such as the AGILENT TECHNOLOGIES ACCESS7 system, extract data from message signaling units generated by SS7: SSPs and STPs to generate CDRs. There are many different CDR formats in the industry each containing different types of information depending on what the CDR will be used for. It is worth noting that there are several efforts at formulating standards for CDR content, such as ANSI standard TIA/EIA-124 Revision D for CDR content for wireless applications.

What constitutes a CDR varies by vendor and customer and even within a single OSS family. Different applications, such as billing, fraud detection, and business intelligence may direct the formation of CDRs with varying content. The most common type of CDR is a billing CDR and the most common format in the US is Automatic Messaging Accounting (AMA) format. Further, and with respect to the present invention, known packet network devices, such as softswitches, generate data about a call that varies considerably from the data produced by a circuit switch, but such data can still be considered a CDR for the purposes of the present invention. CDRs may be analyzed to provide information that can assist with service assurance, fulfillment and billing problems. CDRs can be further enriched by Business Intelligence systems, such as the AGILENT BI system, for further development of useful information.

As used herein, the term call detail record (CDR) refers to any electronic record of the details of a call including, for example, originating number (NPA/NXX), terminating number (NPA/NXX), time, duration, etc. . . . The applicability of the present invention will remain regardless of the nomenclature, content and format of the electronic record that may vary from vendor to vendor and system to system.

An understanding of the type of data contained in a CDR may prove helpful to understand the present invention. Table 1 is an example of a CDR specification used by business intelligence applications associated with AGILENT's ACCESS7 OSS.

TABLE 1

| Field Name | Description |
| --- | --- |
| CDR_DATE | The date that the CDR was loaded into the repository. |
| CDR_ID | A sequence numbers for the CDR. This can be used to link this table row to a row in another table. This is useful for enriching a CDR with rating information, etc. |
| DMC_ID | Each Data Management Center (DMC) in the world has an identifier that is encrypted in the product activation license. Tagging a CDR with this identifier allows the originating DMC to be determined in situations Where data is handed off between DMC systems. |
| PARTITION_ID | Each Oracle partition has an identifier. This field is used primarily to bin CDRs into the correct partition and has little user value. |
| STUDY_ID | A sequence number for a specific acceSS7 filter configuration over a specified period of time. Tagging a CDR with this identifier allows the determination of the exact acceSS7 configuration (filters, links...) that caused this CDR to be collected. |
| CLASS_ID | The acceSS7 class ID that is associated with this CDR. |
| SITE_ID | Specifies the acceSS7 site number that collected this CDR. |
| TIMEZONE | Specifies the time zone upon which all times in the CDR are based. |
| INCOMPLETE_FLG | A flag that specifies that acceSS7, was not able to completely populate the CDR. |
| CALL_IN_PROGRESS_FLG | A flag that specifies a call that is still in progress. |
| CALL_TIMEOUT_FLG | A flag that specifies that an acceSS7 timeout occurred before all parts of a call were collected. |
| REPEATING_CALL_IN_PROGRESS_FLG | |
| FORCED_DELIVERY_FLG | |
| OPC_1 | The 1st component of the originating point code. |
| OPC_2 | The 2nd component of the originating point code. |
| OPC_3 | The 3rd component of the originating point code. |

TABLE 1-continued

| Field Name | Description |
| --- | --- |
| DPC_1 | The 1st component of the destination point code. |
| DPC_2 | The 2nd component of the destination point code. |
| DPC_3 | The 3rd component of the destination point code. |
| CALLING_NUMPLAN | |
| CALLING_NPA | The NPA component of the calling number. |
| CALLING_NXX | The NXX component of the calling number. |
| CALLING_LINE | The LINE component of the calling number. |
| CALLING_INT_NUM | The entire calling number if the number is thought to be international. |
| CALLING_PARTY_CAT_CD | |
| CALLED_NPA | The NPA component of the called number. |
| CALLED_NXX | The NXX component of the called number. |
| CALLED_LINE | The LINE component of the called number. |
| CALLED_INT_NUM | The entire called number if the number is thought to be international. |
| CHARGE_NPA | The NPA component of the charge number. |
| CHARGE_NXX | The NXX component of the charge number. |
| CHARGE_LINE | The LINE component of the charge number. |
| CHARGE_INT_NUM | The entire charge number if the number is thought to be international. |
| CALLED_NUMPLAN | |
| IAM_DATE_TIME | The initial address message date/timestamp (nearest second). |
| IAM_MILLISEC | The initial address message timestamp (milliseconds component). |
| ANM_DATE_TIME | The answer message date/timestamp (nearest second). |
| ANM_MILLISEC | The answer message timestamp (milliseconds component). |
| REL_DATE_TIME | The release message date/timestamp (nearest second). |
| REL_MILLISEC | The release message timestamp (milliseconds component). |
| EXM_DATE_TIME | The exit message date/timestamp (nearest second). |
| EXM_MILLISEC | The exit message timestamp (milliseconds component). |
| ACM_DATE_TIME | The address completes message date/timestamp (nearest second). |
| ACM_MILLISEC | The address completes message timestamp (milliseconds component). |
| RLC_DATE_TIME | The release-clear message date/timestamp (nearest second). |
| RLC_MILLISEC | The release-clear message timestamp (milliseconds component). |
| IAM_REL_DUR | Time duration between IAM and REL messages (seconds). |
| IAM_REL_CCS | Time duration between IAM and REL messages (CCS). |
| ANM_REL_DUR | Time duration between ANM and REL messages (seconds). |
| ANM_REL_CCS | Time duration between ANM and REL messages (CCS). |
| CALLING_NATR_ADDR_CD | Acronym describing the context of the calling number derived from the calling nature of address indicator. |
| CALLING_NATR_ADDR_IND | Raw calling nature of address indicator. |
| CALLING_EVEN_ODD_FLG | Even/odd number of address signals for calling number. |
| CALLED_NATR_ADDR_CD | Acronym describing the context of the called number derived from the called nature of address indicator. |
| CALLED_NATR_ADDR_IND | Raw called nature of address indicator. |
| CALLED_EVEN_ODD_FLG | Even/odd number of address signals for called number. |
| CHARGE_NATR_ADDR_CD | Acronym describing the context of the charge number derived from the charge nature of address indicator. |
| CHARGE_NATR_ADDR_IND | Raw charge nature of address indicator. |
| CHARGE_EVEN_ODD_FLG | Even/odd number of address signals for charge number. |
| ORIG_LINE_CD | Represents toll class of service for the call. |
| CARRIER_ID_CD | Identifies the carrier selected by the caller. |
| CARRIER_SELECT_CD | Identifies how the caller selected a carrier. |
| TCIC | Trunk circuit identification code. |
| JURISDICTION | Numerical data indicating the geographic origination of the call. |
| BACKWD_CHARGE_CD | Backward charge indicator for called party. |
| BACKWD_CALLED_STAT_CD | Backward called party's status indicator. |
| BACKWD_CALLED_CAT_CD | Backward called party's category indicator. |

TABLE 1-continued

| Field Name | Description |
| --- | --- |
| BACKWD_END_TO_END_CD | Backward end-to-end method indicator. |
| BACKWD_INTERWORK_FLG | Backward interworking indicator. |
| BACKWD_IAM_SEG_FLG | Backward IAM segmentation indicator. |
| BACKWD_ISUP_FLG | Backward ISDN user part indicator. |
| BACKWD_HOLDING_FLG | Backward holding indicator. |
| BACKWD_ISDN_ACCESS_FLG | Backward ISDN access indicator. |
| BACKWD_ECHO_CNTL_FLG | Backward echo control device indicator. |
| BACKWD_SCCP_CD | Backward SCCP method indicator. |
| RELEASE_CAUSE_CD | Indicates the reason for releasing a specific connection. Note CDRs are generated for failed calls as well as successful calls. |
| RELEASE_LOC_CD | Indicates where the release was initiated. |
| TRANSIT_NETWORK_CD | Indicates the long distance carrier or transit network to be used to carry this call. This is used whenever the call is an inter-LATA call or international call. |
| ORIG_CALLED_NUMPLAN | |
| ORIG_CALLED_NPA | Used when call redirecting (forwarding) occurs. Identifies the NPA component of the number of the party that initiated the redirection. |
| ORIG_CALLED_NXX | Used when call redirecting (forwarding) occurs. Identifies the NXX component of the number of the party that initiated the redirection. |
| ORIG_CALLED_LINE | Used when call redirecting (forwarding) occurs. Identifies the LINE component of the number of the party that initiated the redirection. |
| ORIG_CALLED_INT_NUM | Used when call redirecting (forwarding) occurs. Identifies the entire number of the party that initiated the redirection if this number is thought to be international. |
| ORIG_CALLED_NATR_ADDR_IND | Raw original called number nature of address indicator. |
| REDIRECT_NPA | Used when call redirecting (forwarding) occurs. Identifies the NPA component of the number to which the called number is to be redirected. |
| REDIRECT_NXX | Used when call redirecting (forwarding) occurs. Identifies the NXX component of the number to which the called number is to be redirected. |
| REDIRECT_LINE | Used when call redirecting (forwarding) occurs. Identifies the LINE component of the number to which the called number is to be redirected. |
| REDIRECT_INT_NUM | Used when call redirecting (forwarding) occurs. Identifies the number to which the called number is to be redirected if this number is thought to be international. |
| REDIRECT_NATR_ADDR_IND | Raw redirecting number nature of address indicator. |
| ORIG_REDIRECT_REASON_CD | Indicates the reason the original redirection occurred. |
| REDIRECT_REASON_CD | Indicates the reason for subsequent redirection. |
| REDIRECT_COUNT | Indicates the number of redirections that have occurred. |
| FORWD_IN_INT_CALL_FLG | Forward incoming international call indicator. |
| FORWD_END_TO_END_CD | Forward end-to-end method indicator. |
| FORWD_INTERWORK_FLG | Forward interworking indicator. |
| FORWD_IAM_SEG_ | FLG Forward IAM segmentation indicator. |
| FORWD_ISUP_FLG | Forward ISDN user part indicator. |
| FORWD_ISUP_PREF_CD | Forward ISDN user part preference indicator. |
| FORWD_ISDN_ACCESS_ | FLG Forward ISDN access indicator. |
| FORWD_SCCP_CD | Forward SCCP method indicator. |
| FORWD_PORTED_NUM_FLG | Forward ported number translation indicator. |
| LRN_NPA | Used with Local Number Portability (LNP). Indicates the NPA component of the local routing number. |
| LRN_NXX | Used with Local Number Portability (LNP). Indicates the NXX component of the local routing number. |
| LRN_LINE | Used with Local Number Portability (LNP). Indicates the LINE component of the local routing number. |
| LRN_INT_NUM | Used with Local Number Portability (LNP). Identifies the local routing number if this number is thought to be international. |
| GAP_NPA | Indicates the NPA component of the Generic Address Parameter (GAP) number. When LNP is provided, the GAP provides the actual dialed digits for a ported number. |
| GAP_NXX | Indicates the NXX component of the Generic Address Parameter (GAP) number. When LNP is provided, the GAP provides the actual dialed digits for a ported number. |
| GAP_LINE | Indicates the LINE component of the Generic Address Parameter (GAP) number. When LNP is |

TABLE 1-continued

| Field Name | Description |
|---|---|
| | provided, the GAP provides the actual dialed digits for a ported number. |
| GAP_INT_NUM | Indicates the Generic Address Parameter (GAP) number if the number is thought to be international. When LNP is provided, the GAP provides the actual dialed digits for a ported number. |
| GAP_TYPE_OF_ADDR_IND | Indicates the type of address contained in the Generic Address Parameter (GAP). |
| GAP_NATR_OF_ADDR_IND | Raw Generic Address Parameter (GAP) nature of address indicator. |
| OUT_TRUNK_GROUP_NUM | Outgoing trunk group number. |
| SERVICE_CODE_CD | Service code assigned by the North American Numbering Plan Administration. Can be used to identify a specific type of service. |
| CIP_SEQ_NUM | This is a number assigned sequentially from 0 for each CDR pertaining to the same leg of the same call. For example, if RCIP/CIP CDRs are configured, the first CIP CDR has a sequence number of 0, the first RCIP CDR has a sequence number of 1, the second RCIP CDR has a sequence number of 2 and so on. With CIP CDRs, but no RCIP CDRs, the CIP CDR has a sequence number of 0 and the final CDR a sequence number of 1. With no CIP CDRs at all, the final CDR has a sequence number of 0. |
| CIP_CORRELATION_ID | This is an identifier which is the same for all CIP CDRs which apply to the same leg of the same call (and different from all other CIP CDRs) |
| CIP_START_TIME | The start time of the period covered by this call in progress CDR (accurate to 1 second) |
| CIP_START_MILLISEC | The milliseconds portion of the CIP_START_TIME |
| CIP_END_TIME | The end time of the period covered by this call in progress CDR (accurate to 1 second) |
| CIP_END_MILLISEC | The milliseconds portion of the CIP_END_TIME |
| CORRELATION_ID | Sequences number for a correlated set of CDRs. Given a CDR that is a member of a correlated set, this can be used to find the other members of the correlated set. |
| CORRELATION_DUPLICATE_FLG | This flag indicates that this CDR is thought to be identical to another CDR within the set of CDRs to be correlated. |
| CORRELATABLE_FLG | This flag indicates that this CDR is thought to be complete enough to be included in the correlation processing. |
| ENRICHED_CALLING_NPA | Contains the CALLING_NPA to be used in the correlation process. Local number portability, number completion, etc can influence the contents of this column. |
| ENRICHED_CALLING_NXX | Contains the CALLING_NXX to be used in the correlation process. Local number portability, number completion, etc can influence the contents of this column. |
| ENRICHED_CALLING_LINE | Contains the CALLING_LINE to be used in the correlation process. Local number portability, number completion, etc can influence the contents of this column. |
| ENRICHED_CALLING_INT_NUM | Contains the calling digits to be used in the correlation process in the event they are thought to be an international number. Local number portability, number completion, etc can influence the contents of this column. |
| ENRICHED_CALLED_NPA | Contains the CALLED_NPA to be used in the correlation process. Local number portability, number completion, etc can influence the contents of this column. |
| ENRICHED_CALLED_NXX | Contains the CALLED_NPX to be used in the correlation process. Local number portability, number completion, etc can influence the contents of this column. |
| ENRICHED_CALLED_LINE | Contains the CALLED_LINE to be used in the correlation process. Local number portability, number completion, etc can influence the contents of this column. |
| ENRICHED_CALLED_INT_NUM | Contains the called digits to be used in the correlation process in the event they are thought to be an international number. Local number portability, number completion, etc can influence the contents of this column. |

TABLE 1-continued

| Field Name | Description |
|---|---|
| CORRELATION_CONFIDENCE | This parameter indicates the degree of confidence associated with the correlation of this CDR with other CDRs. This is a bit-wise parameter where each bit has a specific meaning. |
| CROSS_CORRELATION_ID | |

Referring once again to FIG. 2, a packet network 222 is shown connected to the PSTN network via trunking media gateways (TMG) 226 and 228. A softswitch 224 controls the TMGs 226 and 228. Softswitches often are, physically remote from the gateways. In use, calls on mixed networks are set up using out of band signaling, for example via an SS7 network. In the example shown in FIG. 2, the STPs 218b and 220b are connected to the softswitch 224. For calls from subscriber 250 to subscriber 252 that will be connected across the packet network 212, the STP 218b and the softswitch 224 negotiate a connection from the switch 213a via the TMGs 226 and 228 and to the IXC switch 213b. Alternatively, the switches 210 can be connected directly to the MG 226. In yet another alternative, the phone 250 can be VoIP enabled phone and be directly connected to the packet network 220.

The softswitch 224 also initiates a connection between the media gateway 226 and a media gateway 228 across the IP network 222. Voice traffic across the IP network 222 is carried as Voice over Internet Protocol traffic (VoIP). A SS7 negotiated connection is also set up between the media gateway 228 and the switch 214a (or the switch 213b). Unless explicitly informed, via extensions to existing SS7 parameters populated by the softswitch, the switch 214a, and therefore the LEC 1, has no way of knowing that the IXC is utilizing an IP network in the circuit. Similarly, the LEC 2 also has no way of knowing if the IXC is utilizing an IP network in the circuit While SS7 parameters indicating the traversing of a packet network may eventually be standard, currently, no IXCs or LECs populate anything that would confirm passage over a packet network. It must also be recognized that any such extensions will probably be optional and hence not consistently populated by carriers.

In accordance with a preferred embodiment of the present invention, an analysis device 258 receives data from the PSTN network and the packet network. More specifically, the analysis device 258 monitors an SS7 connection, such as between the STP 220b and the softswitch 224, and traffic to and from the softswitch 224 (using for example a connection to a router (not shown)). The analysis device 258 cross-references SS7 data with data from the softswitch 224 (for example MGCP data) to generate correlated call detail records from which an identification of call crossing packet network 222 can be made on the basis of the destination switch and LEC.

Figure 3:
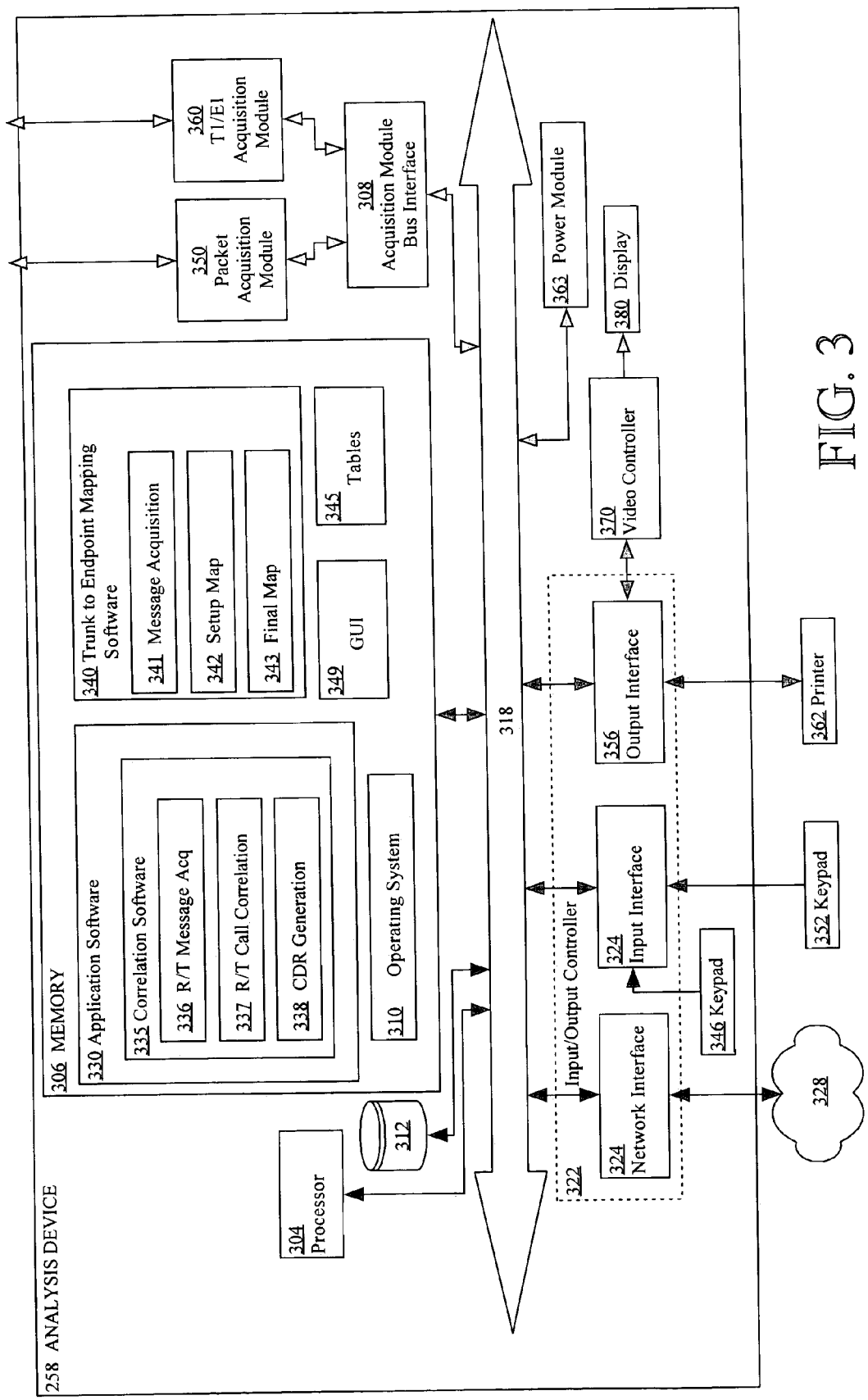
FIG. 3 is a block diagram of an analysis device for use in systems and methods of the present invention.

FIG. 3 is a block diagram illustrating an exemplar network analysis device 258 that may be used to implement the present invention. Generally, in terms of hardware architecture, as shown in FIG. 3, the analysis device 258 includes a processor 304, memory 306 (one or more random access memory (RAM) elements, read only memory (ROM) elements, etc.), an optional removable media disk drive 312, an acquisition module bus interface 308, referred to below as a "bus interface," an input/output controller 322 and a power module 363 that are connected together and can communicate with each other via a local interface 318. The local interface 318 can be, for example but not limited to, one or more buses or other wired or wireless connections, as is known to those having ordinary skill in the art. The local interface 318 may have additional elements, which are omitted for simplicity, such as buffers (caches), drivers, and controllers, to enable communications. Further, the local interface 318 includes address, control, and data connections to enable appropriate communications among the aforementioned components.

The processor 304 is a hardware device for executing software that can be stored in memory 306. The processor 304 can be any suitable processor for implementing the functionality of the analysis device 258. Preferably, the analysis device 352 executes on a SUN workstation available from SUN Microsystems.

The memory 306 can include any one or a combination of volatile memory elements (e.g., random access memory (RAM, such as DRAM, SRAM, etc.)) and nonvolatile memory elements (e.g., RAM, ROM, hard drive, tape, CDROM, etc.). Moreover, the memory 306 may incorporate electronic, magnetic, optical, and/or other types of storage media. Note that the memory 306 can have a distributed architecture, where various components are situated remote from one another, but can be accessed by the processor 304.

The software in memory 306 may include, one or more separate programs, each of which comprise one or more code segments, which are an ordered listing of executable instructions for implementing logical functions. In the example of FIG. 3, the software in the memory 306 includes software in the form of an analysis device application software 330 and trunk to endpoint mapping software 340. The trunk to endpoint mapping software 340 includes message acquisition software 341, call setup mapping software 342 and final mapping software 343. The memory also includes tables 345, which are created by the trunk to endpoint mapping software 340.

In accordance with an embodiment of the invention, the analysis device application software 330 further includes correlation of mapped trunk to endpoint identifier software 335, referred to hereafter as "correlation software" 335. The correlation software 335 includes real time message acquisition software 336, real-time call correlation software 337, and CDR generation software 338. The memory 306 also includes a graphical user interface (GUI) 349. The GUI 349 processes display information on the display 380.

In accordance with that described in copending, commonly assigned U.S. patent application Ser. No. 10/151,374, incorporated herein by reference, the trunk to endpoint mapping software 340 maps an MGCP endpoint name to a corresponding PSTN point code and trunking circuit identification code creating a PC-TCIC to Endpoint mapping table. A point code (PC) is a unique address code that identifies a service provider within a signaling network. A trunking circuit identification code (TCIC) uniquely identifies each SS7 message trunk interconnecting two switches. The correlation software 335 uses, among other items, information that is contained in the PC-TCIC to Endpoint mapping table to correlate call signaling information from the PSTN and the packet network into a call record.

The memory 306 also includes one or more operating software modules, collectively referred to as operating system (O/S) 310. The O/S 310 may include software modules that perform some of the functionality of the analysis device 258 not specifically described herein.

In a preferred embodiment, the O/S 310 is the commonly available UNIX operating system available from SUN Microsystems. However, other operating systems may be used. The operating system 310 essentially controls the execution of other computer programs, such as the analysis device application software 330, correlation and display software 335, and the trunk to endpoint mapping software 340, and provides scheduling, input output control, file and data management, memory management, and communication control and related services. The processor 304 and operating system 310 define a computer platform, for which application programs, such as the analysis device application software 330, correlation and display software 335, and the, trunk to endpoint mapping software 340, are written in higher level programming languages. The correlation and display software 335 and the trunk to endpoint mapping software 340 include the executable instructions that allow the analysis device 258 to detect, decode, map, correlate and display in real-time dissimilar communication protocol messages that, relate to the same user traffic.

The input/output controller 322 includes a network interface 324, an input interface 342 and an output interface 356 each in communication with the local interface 318. The network interface 324 couples the analysis device 258 to an external network 328. The external network can be any network to which the analysis device 258 may couple to exchange information. The input interface 342 is coupled to an internal keypad 346 and to an external keypad 352. The internal keypad 346 is located on the analysis device 258 while the external keypad 352 is an auxiliary keypad to which the test device 258 may be coupled.

The output interface 356 is coupled to a printer 362. The printer 362 can be used to provide a permanent record of the analysis results obtained by the analysis device 258. The output interface 356 also couples to a video controller 370. The video controller 370 couples to a display 380. The display 380 can be an LCD touch screen display capable of receiving input from a user, but may be any type of suitable display.

The disk drive 312 can be any storage element or memory device, and as used herein, generally refers to flash memory, sometimes referred to as compact flash (CF) or PC-card.

The power module 363 can power the analysis device 258 from an AC power source, or can include batteries and a built in charger to provide portable DC power.

The bus interface 308 provides both electrical and mechanical interfaces to a packet acquisition module 350 and a T1/E1 acquisition module 360. In accordance with an aspect of the invention, the packet acquisition module 350 couples to the packet network 106 (FIG. 1) and the T1/E1 acquisition module, 360 couples to the PSTN. The packet acquisition module 350 monitors the packet network signaling traffic and the T1/E1 acquisition module 360 monitors the PSTN signaling traffic, i.e. SS7.

The trunk to endpoint mapping software 340 detects decodes and stores PC/TCIC information from SS7 messages and endpoint information from MGCP messages. Once the PC/TCIC and endpoint name information is stored, the trunk to endpoint mapping software 340 builds a count table that maps the PSTN PC/TCIC identifier to a corresponding packet network MGCP endpoint identifier. In this manner, a call record can be developed that defines both the packet network and PSTN aspects of the call. The correlation software 335 detects in real-time all; packet network signaling messages (in this example, MGCP messages) and PSTN network signaling messages (in this example, SS7 messages), and correlates these messages into a CDR pertaining to a single call. In other words, all messages, regardless of whether they are packet network signaling messages or PSTN network signaling messages that correspond to a particular call are correlated into a single (or perhaps multiple related) CDRs. In this manner all messages that correspond to each call traversing the dissimilar communication networks are encapsulated into a single CDR and output by the CDR generation software 338.

When the analysis device 258 is in operation, the processor 304 is configured to execute software stored within the memory 306, to communicate data to and from the memory 306 and to generally control operations of the analysis device 258 pursuant to the software. The trunk to endpoint mapping software 340 and the correlation and display software 335 are read by the processor 304, perhaps buffered within the processor 304, and then executed.

Referring once again to FIG. 2, the analysis device 258 is connected to a database 254 to which the analysis device 258 feeds CDRs regarding traffic traversing the packet network 222 and the PTSN, as exemplified by the long distance network 212. The database 254 is accessed via a computer system 256. Depending on the architecture used, the database 254 can be simply storage space, or more preferably it can be configured to do some of all of the data processing performed on the data stored therein. By way of example, the database 254 could comprise an Oracle database system or an AGILENT Business Intelligence system. Similarly, the computer system 256 can simply act as a terminal for the database 254 or it can be configured to perform data analysis on data retrieved from the database 254.

In accordance with a preferred embodiment of the present invention, analysis device 258, the database 254 and/or computer system 256 correlate received CDRs (if necessary) to, preferably, generate a single CDR for each call. It may also prove preferable to generate a series of records related to each call. The resultant CDRs are enriched with data that enables the creation of additional information regarding the call described by the CDR. Subsequently, dimensions are identified and the CDRs are summarized to provide reports based on the identified dimensions. For example, a listing of all CDRs that indicate the use of a packet network in the described connection may be generated. Such a list may be sorted by terminating LEC, the jurisdiction of the calls (interstate, intrastate and local) and the gateway utilized. A minutes of use (MOU) is calculated for gateway for each LEC. This information can be utilized to generate tariffs for the LEC. For example, the tariff for traffic that utilizes a packet network can be billed at a different rate than traffic confined to a circuit switched network.

Figure 4:
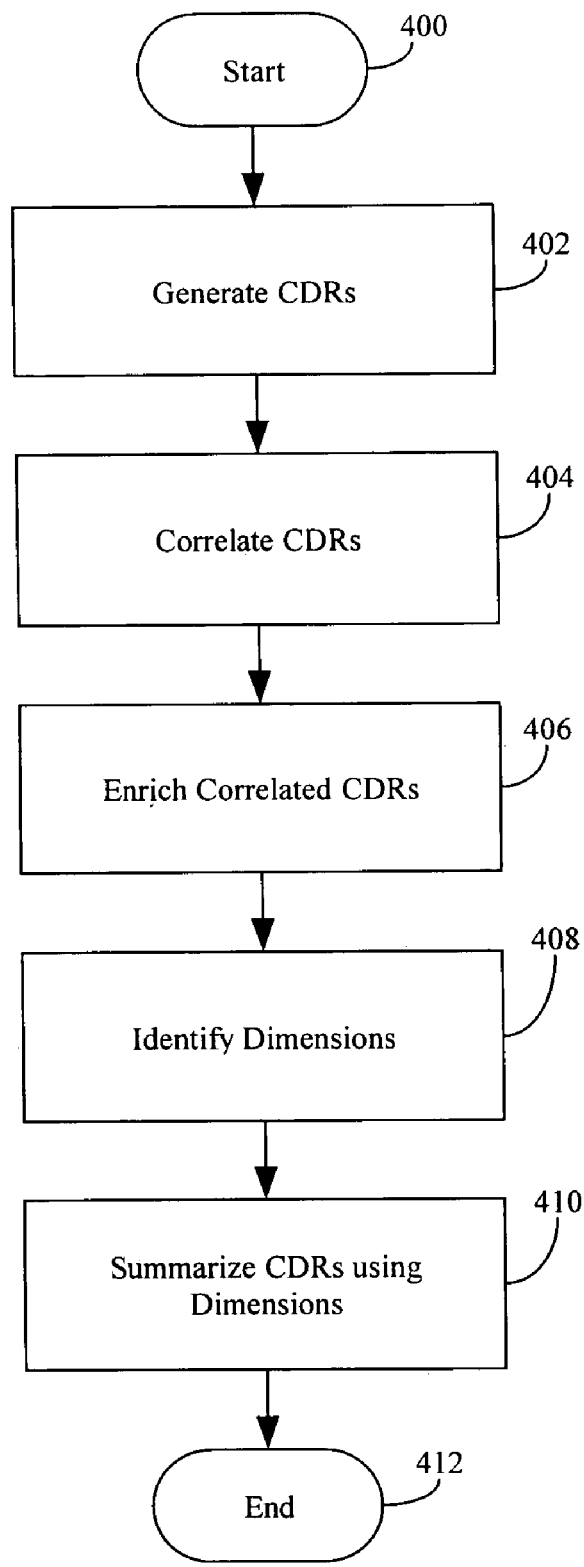
FIG. 4 is a flow chart of a method for generating a report in accordance with a preferred embodiment of the present invention.

FIG. 4 is a flow chart of a method for generating jurisdiction reports in accordance with a preferred embodiment of the present invention. The method starts in step 400. In step 402 the relevant CDR's for a particular call are correlated, for example by the analysis device 258 and the database 254.

Normally each switch or other network element on a call path produces a single CDR per call. Most CDR producing devices, for example a voice telephony switch, keep internal call state information used to control processing of the call.

This call state information allows the switch to know the exact status of the call at any instant in time. This information may include: the called party address (phone number); the calling party (phone number); the party to be billed (Charge number); jurisdiction information; the state of the call (i.e., off-hook, ringing, dialing, conversation, etc.) including timestamps for each change of state; any additional features used in the call (three-way calling, call forwarding, etc.); the nature of the line placing the call (i.e., test line, etc.); and routing information. Call state information, as well as other internal tables describing the network and subtending customers, is shared among network devices to set up the call. This information is communicated by signaling using such standards as SS7. CDR producing devices output CDRs based on the call state information, both that portion stored internally and that portion received via the signaling network.

An alternate method of creating a CDR is by signaling monitoring. That is, using an external device to monitor all call signaling, keep track of call state, and generate an independent CDR. To generate CDRs in this manner, the monitoring equipment must perform many of the same functions as the, switch itself. It must keep track of the state of the call and must keep accurate timestamps on each change of state. Usually a change of state coincides with a new signaling message; therefore the monitoring device must accurately timestamp all signaling messages. The monitoring device must also be able to extract and record parameters contained in each signaling message. At the end of each call, the monitoring system can record these parameters as well as times it observed changes in call state to produces CDR.

In VoIP, the SS7 standard provides the information needed to bridge between the standard telephony network and the IP network. Thus, monitoring devices, such as the analysis device 258 monitor SS7 messages between TDM switches and VoIP switches, sometimes called softswitches. Examples of important information obtained from SS7 are: the calling party number describing the phone set that originated the call; the called party number describes the phone set that is being called; the Jurisdiction Information Parameter (JIP) describing the jurisdiction of the originating phone set (particularly important when the originating line is not fixed and its phone number cannot identify its location); the charge party number describing the line that should be billed for the call; the Trunk Circuit Identification Code (TCIC) describing the trunk circuit the call was placed over; the Trunk hold time indicating the time interval that a particular trunk circuit is dedicated to a single call (derived by subtracting the time the Initial Address Message (IAM) is observed from the time the Release Complete (RLC) message is observed); the conversation time indicating the time the parties actually are communicating over the circuit (derived by subtracting the time the Answer message (ANS) is observed from the time the Release (REL) message is observed); and interworking information describing whether the call was signaled using SS7 along its entire route (This parameter does not indicate what type of alternative signaling was used; simply that another type of signaling was employed in the path of the call). Some of this information is available from VoIP specific signaling messages, but they are guaranteed to me in SS7 message. In general, when information is available in both SS7 and VoIP signaling message, the SS7 message should be more reliable. Of course, if a call does not pass through a TDM network, there will be no SS7 signaling and all information must be obtained via VoIP signaling.

One piece of information not available from observing SS7 messages is whether the call passed through any IP networks as it is being routed between carriers or within a carriers own network. SS7 also does not provide information on any IP specific parameters such as packet loss, voice quality, voice encoding or any enhanced services utilized in the IP network. This information must be obtained from monitoring VoIP signaling messages and correlating such information with the circuit switched network based information described above. The are two basic types of VoIP protocols to consider: peer to peer and centralized.

Peer to peer protocols require that the endpoints of the network (i.e., the telephones or gateways) keep their own call state information. This means that only smart phones or softswitches can use these types of protocols to setup and tear down calls. Session Initiation Protocol (SIP) and ITU standard H.323 are VoIP signaling protocols commonly referred to as peer to peer protocols. Both of these protocols describe an architecture where a new network element can be used to facilitate signaling routing and can contain call state. These devices are called stateful proxies in SIP and Gatekeepers in H.323. As SIP and H.323 are very similar in function, the following example of deriving a CDR uses SIP terminology. Those of ordinary skill in the art will recognize that the steps performed are relevant to H.323.

SIP messaging allows intelligent IP devices to set up multimedia sessions between themselves. SIP messages contain "headers" that describe call parameters. Typically the body contains information that describes details about the IP session for the VoIP call. The body may also contain an embedded SS7 message or even a message in another protocol. Any portion of a call that was setup and torn down using SIP signaling is VoIP. With respect to the present invention, even if the call originates or terminates on a circuit switched network, the fact that there was observed SIP signaling means that the call was interworked with IP.

Examples of important information that can be obtained from monitoring SIP messages include: the IP addresses and ports for each endpoint (smart phones or SIP gateways); the route the signaling took through the signaling network (i.e., the proxies involved in the call); the "From address", equivalent to the calling party number; the "To address", equivalent to the called party number; the equipment type at the origin of the call; the IP voice encoding used; the post dial delay for each call, that is, the time from the end of dialing until the network responds to the user (derived by subtracting the observed time of the INVITE message from the observed time of the ringing, forwarded or queued (SIP 180, 181, 182) responses); the Call Duration, that is, the time the IP connection, and all gateway trunking is occupied with a particular call (derived by subtracting the observed time of the INVITE message from the observed time of the SIP BYE message); Quality of Service and billing information, that is, information about packets that were lost, packet arrival jitter and delay (passed if the proxy is stateful and must generate billing records); and whether any enhanced services were used in this call.

VoIP networks operating with centralized protocols have a master/slave relationship. That is, a controller in the network, usually called a softswitch, keeps call state information on behalf of the endpoints (phones). In a centralized architecture, the endpoints can be much less intelligent than in a SIP based network. However, it is common practice to use, SIP for softswitches to communicate with each other. Megaco, H.248 and MGCP are examples of centralized protocols. Since Megaco and H.248 are essentially the same protocol and both will perform the same functions as MGCP, the following discussion with focus on how MGCP may be used for deriving CDR information.

Each MGCP message starts with a command or response line followed by one or more parameters that provide information about the call. All commands are followed by a response indicating whether the command was successfully carrier out. Since call state is kept at the softswitch, there is much more information passed between endpoints and the softswich than in SIP networks. Since the softswitch also has billing responsibilities, the endpoints must pass billing and Quality of Service (QoS) information.

Examples of important information that can be obtained from monitoring MGCP messages include: the IP addresses and ports for each endpoint (gateways); the IP voice encoding used; the dialtone delay for each call, that is, the time between the user going off-hook and the network responding with dialtone (derived by subtracting the time the REQUEST NOTIFICATION message informing the gateway to provide dialtone was observed from the time that the MGCP NOTIFY message informing the softswitch that the customer went off-hook was observed); the post dial delay for each call, that is, the time from the end of dialing until the network responds (derived by subtracting the observed time of the NOTIFY message informing the softswitch of the phone number dialed from the observed time of the MODIFY CONNECTION message informing the gateway to cut through a two way IP connection); the Connect Time (Duration), that is, the time users are connected and able to communicate with each other (derived by subtracting the observed time of the DELETE CONNECTION message informing the gateway to disconnect all IP connections from the observed time of the last 250 response for the MODIFY CONNECTION message informing the gateway to cut through a two way IP connection); Quality of Service and billing information, that is, information about packets that were lost, packet arrival jitter and delay; and whether any enhanced services were used in the subject call.

As in the case of SIP signaling, the presence of any MGCP signaling indicates that this leg of the call was VoIP. Even if the call originates or terminates on a circuit switched network, the fact that there was observed MGCP signaling means that the call was interworked with IP.

There are basically two ways that service providers utilizing VoIP technology can interconnect. First is the case where one of the providers uses an internal VoIP network and converts back to circuit switched to hand traffic off to another interconnecting carrier, this will be referred to as IP-CS. The second is where both carriers utilize VoIP and they can hand traffic off to each other using a direct IP-IP interconnect.

In the first case, IP-CS, the circuit switched carrier does not utilize VoIP and accepts circuit switched traffic only. This may be the case today between an IXC that has deployed VoIP and a LEC who has not. In this case it is relatively straightforward to determine the jurisdiction of the traffic but difficult to determine whether the traffic was ever carried over an IP network. In the case where traffic is handed off using an IP-IP interconnect the reverse is true; it is easy to see that the interconnect traffic is VoIP but more difficult to determine the jurisdiction.

For carriers that utilize IP-CS for interconnect, CDRs from the VoIP network are correlated with CDRs from the Circuit Switched, SS7 network. The CDR from the VoIP network (i.e., SIP or MGCP) are used to prove that the call did traverse a VoIP network at some point and whether any enhanced services were utilized. The VoIP CDR may also be used to provide interconnect metrics that are specifically IP oriented such as QoS and voice quality information. Such interconnect metrics are not typically used today but may become important as more and more traffic crosses IP networks and customers become more sensitive to voice quality variations caused by IP. Since the call appears at the interconnect point in circuit switched form, all of the information needed for jurisdiction determinations can be found in the SS7 signaling and static reference data.

For carriers that utilize IP-IP for interconnects, all signaling will be SIP (or H.323) as there is no SS7 signaling on the interconnect point between carriers. All information needed for determining jurisdiction needs to be obtained from the VoIP CDR.

Returning once again to in FIG. 4, in step 404 CDRs built by monitoring VoIP signaling are correlated with SS7 based CDRs (if any) to get a complete record of the call as well as permit the determination as to whether a call is VoIP call or enhanced services were utilized during the call. Call correlation in an IP-CS network requires a link between the IP domain and the circuit switched domain. This is accomplished through the IP endpoint identifier—TCIC mapping table, i.e. the tables 345 in FIG. 3. In IP signaling, the circuits (trunks) on the gateways are known by end point identifiers. A major function of the gateway is to map all packets from an IP address and port number to an endpoint identifier. In general, there is always a one to one mapping between trunks and end point identifiers. The endpoint identifier can be obtained by observing VoIP signaling, for example by monitoring CRCX commands. The reference data is then used to lookup a TCIC that uniquely identifies the trunk, and therefore the SS7 messages related to the call.

Additional SS7 CDRs may also be correlated at this point by monitoring at CDR producing devices in the network. The goal being to produce a single CDR for each call. One example of a system that can be configured to perform this type of correlation is the AGILENT acceSS7 Business Intelligence system.

Once correlation is complete, the combined CDR will indicate that the call traveled over an IP link and back to a circuit switched network. As the CDR contains VoIP signaling information, it becomes possible to identify whether any enhanced services were employed in a call that ultimately appears as a Circuit switched call transiting a VoIP network.

Next, in step 406, the correlated CDRs are enriched. Recall that switches create CDRs based on network information derived from call state that, in turn, is derived from signaling and static customer and network information stored in internal tables. CDRs created from signaling monitoring also require this type of static customer and network information to complete the CDR and make it useful for further processing. A process termed "enrichment" is used to combine these sources of data to make the CDR useful for jurisdiction determinations.

In general the term enrichment refers to a process whereby data in a CDR (termed key data) is used to retrieve additional data (termed reference data) from external sources, which is then added to the CDR. Reference data is typically stored in static (or semi-static) tables. The reference data needed to enrich a CDR generated on a IP-CS interconnect is different from the reference data needed to enrich CDR generated on a an IP-IP interconnect.

TABLE 2 cross references Key data from CDRs with the associated Reference data which is retrieved to enrich the CDR generated on an IP-CS interconnection.

TABLE 2

(IP-CS)

| Key data from CDR | Reference data | Use |
|---|---|---|
| Originating point code, Destination point code and Trunk Circuit Identifier | Trunkgroup identifier, carrier associated with that trunkgroup. | All trunks between two switches may not be dedicated to a single carrier. |
| Point Code | Default NPA-NXX | Used for completing partial telephone numbers seen in signaling messages. |
| Telephone Number | State, Lata, Rate Center | Used to determine the jurisdiction of a telephone number |
| Telephone Number | Special status of a circuit, i.e., UNE, ISP, etc. | Used to determine whether a circuit belongs to someone other than the switch owner |
| Trunk Group Identifier | Usage mapping (e.g. FG-D), Trunk group type (e.g. local, intra lata toll, etc.) | Used to determine what type of traffic to expect over a trunk group |
| NPA-NXX | Service Provider | Used to determine whether a call was between two different service providers. |
| IP endpoint identifier | Trunk Circuit Identifier Code (TCIC) | Used to correlate IP call to Circuit Switched call as the call enters or leaves the IP network |
| Endpoint IP address | Endpoint type | Used to determine whether the call originated from an IP phone or a trunking gateway. This is used to determine whether the call originated in a CS network or not. |

One use of the reference data described above includes using the default NPA-NXX to complete phone numbers in signaling records that are missing some of the required 10-digit information. By utilizing the reference data describing the endpoint to endpoint type mapping, a carrier can identify whether the call originated on a CS trunk or directly from an IP phone Since the call has all SS7 signaling information available and all VoIP information available it is possible to identify other types of traffic for jurisdiction of calls that transited a VoIP network. Using these methods it is possible to determine: calls that originated on wireless phones and transited a VoIP network; transit calls, that is, traffic that transits one network but is ultimately destined for another and transits one or more VoIP networks; calls that employed any enhanced services while in the IP network; and calls that originate in one state and terminate in another and transited an IP network, e.g. Interstate VoIP calls.

In the case of an IP-IP interconnection, as with IP-CS architectures, enrichment is needed to supplement signaling data with static data to create an enriched CDR. The enrichment process is similar to the IP-CS case but utilizes different reference data because no SS7 information is present. The only signaling data available is the CDR created from SIP (or H.323) signaling. TABLE 2 cross-references Key data from CDRs with the associated Reference data which is retrieved to enrich the CDR generated on an IP-IP interconnection.

TABLE 2

(IP-IP)

| Key data from CDR | Reference data | Use |
|---|---|---|
| IP address of gateway | Default NPA-NXX | Used for completing partial telephone numbers seen in signaling messages |
| Telephone Number | State, Lata, Rate Center | Used to determine the jurisdiction of a telephone number |
| Telephone Number | Special status of a circuit, i.e., UNE, ISP, etc. | Used to determine whether a circuit belongs to someone other than the switch owner |
| NPA-NXX | Service Provider | Used to determine whether a call was between two different service providers. |
| Endpoint IP address | Endpoint type | Used to determine whether the call originated from an IP phone or a trunking gateway. This is used to determine whether the call originated in a CS network or not. |

Using the reference data described above, the monitoring system uses the default NPA NXX to complete phone numbers in signaling that are missing some of the required 10-digit information. In IP-IP architectures default NPA-NXXs will be assumed to be assigned by gateways.

In an IP-IP architecture it is obvious that a call entering or leaving a network on an IP interface is a VoIP call. The jurisdiction of the originating terminal is more difficult to determine. In this case the originating telephone number (found in the from header in SIP) may be used just as in the IP-CS case as long as the call originated on a fixed line, non-IP phone. While not foolproof, it is usually safe to assume that the call originated from a fixed line phone as long as the originating IP device was a gateway and not an IP phone. That information can be obtained from the user agent header in SIP signaling. If the user agent header indicates that the call originated on an IP phone then it is impossible to determine the jurisdiction of the originating call.

Using the enriched IP-IP CDR, it is possible to determine: calls that originated on wireless phones and transited a VoIP network; transit calls (traffic that transits one network but is ultimately destined for another and transits one or more VoIP networks); calls that employed any enhanced services while in the IP network; and calls that originate in one state and terminate in another and transited an IP network (e.g. Interstate VoIP calls).

In either case (IP-CS or IP-IP), once the CDRs have been correlated and enriched, the method continues in step 408 with the building various types of jurisdiction reports. In step 408 dimensions are identified and in step 410 CDRs are summarized using the identified dimensions. For example, calls may be summarized on thee dimensions: jurisdiction, gateway used, and trunks used. Each CDR would be examined in step 406 and for each unique combination of the three dimensions a record would be generated containing, for example, the number of answered calls and the total MOU for each unique combination of those three dimensions. A report can be created by retrieving the combinations of dimensions requested, for example limited to a specific set of gateways. The generation of the summary report can be implemented using a variety of generally available products, for example crystal reports or the report generation module of the database used to implement the database 254 (FIG. 2). The method ends in step 412.

FIG. 5 is a representation of a report produced in accordance with a preferred embodiment of the present invention using the dimensions referenced hereinabove.

By way of another example, calls may be summarized using Calling State, Calling LATA, Called State and Called LATA. In this example each CDR would be examined and for each unique combination of the four dimensions a record would be generated containing, for example, the total MOU, the total packets sent, total packets received, the total number of calls and the VoIP minutes for each unique combination of those 4 dimensions. A final report would be obtained by retrieving the combination of dimensions needed for the report. For example, using the same 4 dimensions as above, the report might be all VoIP minutes between New York and Florida for all LATA in those states.

Using the techniques describe above some possible jurisdictional reports could include: VoIP MOU terminating on a LEC network from an IXC; VoIP MOU originating from a LEC to an IXC; VoIP MOU terminating on a LEC network from an IXC from a particular set of gateways or trunks; VoIP MOU terminating on a LEC network from an IXC that is interstate (i.e. originates and terminates in different states); VoIP MOU terminating on a LEC network from an IXC that is intrastate (i.e. originates and terminates in the same state); VoIP MOU terminating on a LEC from a CLEC that is local (i.e., originates and terminates in the same rate center); VoIP MOU terminating on a LEC network from an IXC that uses an enhanced service such as a follow me service or some combination of instant messaging alerting instead of ringing; number of VoIP calls intended for a LEC from an IXC in a particular state that failed, or conversely, that were successful (this could further be modified to include cause of failure); number of calls and MOU terminating on a LEC network from an IXC that had poor voice quality due to excessive packet loss; number of calls and MOU terminating on a LEC network from an IXC that had excessive post dial delay; and number and % of VoIP calls terminating on a LEC from an IXC that did not contain a certain parameter such as calling party number or JIP.

Although an embodiment of the present invention has been shown and described, it will be appreciated by those skilled in the art that changes may be made in these embodiments without departing from the principles and spirit of the invention, the scope of which is defined in the claims and their equivalents.

For example, in perhaps a preferred embodiment, the analysis device 258 is installed and maintained by a trusted third party who issues tariff reports to the owners of the monitored systems, which are envisioned to be interconnected IXCs and LECs. This will ensure that otherwise sensitive information is not shared between the naturally competitive IXCs and LECs beyond that necessary to confirm agreed upon tariffs.

What is claimed is:

1. A system for identifying calls traversing a packet network, the system comprising:
   an analysis device that receives first signaling information from a packet network and second signaling information from a circuit network, the analysis device correlating the first signaling information with the second signaling information to generate correlated records about calls that traverse both the packet switched network and the circuit network;
   a database system that receives the correlated records and calculates statistics describing traffic that traversed both the packet network and the circuit network.

2. A system, as set forth in claim 1, wherein the database system enriches the correlated records prior to calculating the statistics.

3. A system, as set forth in claim 2, wherein the database system enriches the correlated records with information from static tables.

4. A system, as set forth in claim 1, wherein the second signaling information is SS7 message signaling units.

5. A system, as set forth in claim 1, wherein the first signaling information is obtained by signal monitoring.

6. A system, as set forth in claim 5, wherein SIP signals are monitored.

7. A system, as set forth in claim 5, wherein H.323 signals are monitored.

8. A system, as set forth in claim 5, wherein MGCP signals are monitored.

9. A system, as set forth in claim 5, wherein H.248 signals are monitored.

10. A system, as set forth in claim 1, wherein the first signaling information is obtained from a softswitch.

11. A system, as set forth in claim 1, wherein the statistics include minutes of use for calls traversing both the packet network and the circuit network.

12. A system, as set forth in claim 1, wherein the statistics include the number of calls traversing both the packet network and the circuit network.

13. A system, as set forth in claim 1, wherein the statistics include minutes of use for wireless calls traversing both the packet network and the circuit network.

14. A system, as set forth in claim 1, wherein the statistics include the number of wireless calls traversing both the packet network and the circuit network.

15. A system, as set forth in claim 1, wherein the statistics include minutes of use for calls that utilize enhanced services.

16. A system, as set forth in claim 1, wherein the statistics include the number of calls that utilize enhanced services.

17. A system, as set forth in claim 1, wherein the statistics are further sorted by jurisdiction.

18. A system, as set forth in claim 1, wherein the statistics are broken down by gateway.

19. A system, as set forth in claim 1, wherein the statistics are broken down by trunk used.

20. A system, as set forth in claim 1, wherein the packet network is operated by an IXC and the circuit network is operated by an LEC.

21. A system, as set forth in claim 20, wherein the analysis device is operated by a third party.

22. A method for identifying calls traversing a packet network, the method comprising:
    receiving first signaling information from a packet network;
    receiving second signaling information from a circuit network;
    correlating the first signaling information with the second signaling information to generate correlated records about calls that traverse both the packet switched network and the circuit network;
    calculating statistics describing traffic that traversed both the packet network and the circuit network.

23. A method, as set forth in claim 22, further comprising enriching the correlated records prior to calculating the statistics.

24. A method, as set forth in claim 23, wherein the step of enriching the correlated records comprises retrieving information from static tables using keys from the correlated records and adding the retrieved information to the correlated records.

25. A method, as set forth in claim 22, wherein the second signaling information is SS7 message signaling units.

26. A method, as set forth in claim 22, wherein the step of receiving first signaling information comprises monitoring signals on the packet network and extracting the first signaling information.

27. A method, as set forth in claim 26, wherein SIP signals are monitored.

28. A method, as set forth in claim 26, wherein H.323 signals are monitored.

29. A method, as set forth in claim 26, wherein MGCP signals are monitored.

30. A method, as set forth in claim 26, wherein H.248 signals are monitored.

31. A method, as set forth in claim 22, wherein the step of receiving first signaling information comprises receiving the first signaling information from a softswitch.

32. A method, as set forth in claim 22, wherein the statistics include minutes of use for calls traversing both the packet network and the circuit network.

33. A method, as set forth in claim 22, wherein the statistics include the number of calls traversing both the packet network and the circuit network.

34. A method, as set forth in claim 22, wherein the statistics include minutes of use for wireless calls traversing both the packet network and the circuit network.

35. A method, as set forth in claim 22, wherein the statistics include the number of wireless calls traversing both the packet network and the circuit network.

36. A method, as set forth in claim 22, wherein the statistics include minutes of use for calls that utilize enhanced services.

37. A method, as set forth in claim 22, wherein the statistics include the number of calls that utilize enhanced services.

38. A method, as set forth in claim 22, further comprising sorting the statistics by jurisdiction.

39. A method, as set forth in claim 22, further comprising breaking down the statistics by gateway.

40. A method, as set forth in claim 22, further comprising breaking down the statistics by trunk used.

41. A method, as set forth in claim 22, wherein the packet network is operated by an IXC and the circuit network is operated by an LEC.

42. A method, as set forth in claim 41, wherein the method is performed by a third party.

* * * * *